US012644686B2

(12) United States Patent
Hardy et al.

(10) Patent No.: US 12,644,686 B2
(45) Date of Patent: Jun. 2, 2026

(54) MEASUREMENT GAUGE FOR STATOR OF AN ELECTRIC MOTOR HAVING EPOXY COATED HAIRPINS

(71) Applicant: Ford Global Technologies, LLC, Dearborn, MI (US)

(72) Inventors: Evan Lovell Hardy, Ann Arbor, MI (US); Ian George Eickholdt, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 532 days.

(21) Appl. No.: 18/341,310

(22) Filed: Jun. 26, 2023

(65) Prior Publication Data

US 2024/0426590 A1     Dec. 26, 2024

(51) Int. Cl.
G01B 5/06 (2006.01)

(52) U.S. Cl.
CPC ................ G01B 5/061 (2013.01); G01B 5/06 (2013.01); G01B 5/066 (2013.01)

(58) Field of Classification Search
CPC . G01B 5/06; G01B 5/061; G01B 5/08; G01B 5/12; H02K 15/00; H02K 15/028; H02K 15/16; H02K 37/14; Y10T 29/49009; Y10T 29/49011; Y10T 29/49012; Y10T 29/53143
USPC ................... 33/501; 29/596, 597, 598, 732; 310/12.01
See application file for complete search history.

(56) References Cited

U.S. PATENT DOCUMENTS

| | | | | |
|---|---|---|---|---|
| 4,455,743 A | * | 6/1984 | Witwer ................ | H02K 15/105 |
| | | | | 29/736 |
| 6,243,661 B1 | | 6/2001 | Baldwin et al. | |
| 2007/0130753 A1 | * | 6/2007 | Hashimoto ............ | H02K 15/16 |
| | | | | 29/598 |
| 2019/0033051 A1 | | 1/2019 | Bu et al. | |
| 2021/0320570 A1 | * | 10/2021 | Liang ..................... | H02K 15/36 |
| 2022/0140714 A1 | * | 5/2022 | Mawatari ............... | H02K 15/02 |
| | | | | 310/264 |

FOREIGN PATENT DOCUMENTS

CN          106643412          5/2017

* cited by examiner

*Primary Examiner* — John E Breene
*Assistant Examiner* — Daniel M Quinn
(74) *Attorney, Agent, or Firm* — Burris Law, PLLC

(57) ABSTRACT

A measurement gauge for a stator that includes a height gauge part having at least one base surface, legs, and a height checking surface. The base surface faces in a first direction to define a base plane configured to abut an end surface of a core of the stator. The legs are spaced apart in a circumferential direction about an axis and extend in the first direction from the base surface. The legs are configured to be received in holes defined by the core of the stator. The height checking surface is parallel to the base plane and spaced apart therefrom by a predetermined distance. The height checking surface having an annular shape disposed about the axis.

20 Claims, 10 Drawing Sheets

MEASUREMENT GAUGE FOR STATOR OF AN ELECTRIC MOTOR HAVING EPOXY COATED HAIRPINS

FIELD

The present disclosure relates to a measurement gauge for a stator, and more particularly to a measurement gauge for a stator having epoxy coated electrical components.

BACKGROUND

The statements in this section merely provide background information related to the present disclosure and may not constitute prior art.

Electric machines (e.g., electric motors and generators) may be used in a vehicle such as a fully electric vehicle or a hybrid-electric vehicle. The electric machine includes, inter alia, a stator and a rotor. The rotor is supported for rotation within a bore of the stator and includes windings or permanent magnets that interact with windings of the stator to generate rotation of the rotor when the electric machine is energized. The rotor may be supported on a driveshaft that is configured to couple with a load such as a drivetrain of the vehicle.

Stators may go through a manufacturing process in which a portion of electrical components (i.e., an end portion of the hairpin windings, a portion of the terminals, and a portion of the neutral connection) are coated with an epoxy material in order to create an electrically insulative layer. Upon completion of the coating process, dimensions of the epoxy coated electrical components are measured to provide for the epoxy coated electrical components being within predetermined tolerance ranges. Gauges may be used to measure the dimensions of the epoxy coated electrical components.

SUMMARY

This section provides a general summary of the disclosure and is not a comprehensive disclosure of its full scope or all of its features.

In one form, the present disclosure provides a measurement gauge for a stator that includes a height gauge part having at least one base surface, legs, and a first height checking surface. The base surface faces in a first direction to define a base plane configured to abut an end surface of a core of the stator. The legs are spaced apart in a circumferential direction about an axis and extend in the first direction from the base surface. The legs being configured to be received in holes defined by the core of the stator. The first height checking surface is parallel to the base plane and spaced apart therefrom by a predetermined distance. The first height checking surface has an annular shape disposed about the axis.

In variations of the measurement gauge of the above paragraph, which can be implemented individually or in any combination: the height gauge part includes at least one second height checking surface that is recessed in a second direction that is opposite the first direction, the second height checking surface extends in a circumferential direction; the second height checking surface is parallel to the base plane; the height gauge part includes an inner flange extending around an inner periphery of the first height checking surface and extending from the inner periphery of the first height checking surface in the first direction; the height gauge part includes an outer flange extending around an outer periphery of the first height checking surface and extending from the outer periphery of the first height checking surface in the first direction; the height gauge part includes an outer flange extending from an outer periphery of the first height checking surface in the first direction and extending in the circumferential direction, the outer flange including a first end and a second end that is spaced apart from the first end to define an opening; a flap also called a second gauge part, pivotably coupled to the height gauge part between an open position in which the second gauge part is removed from the opening and a closed position in which the second gauge part closes the opening; an inner diameter gauge part slidably engaged along an inner periphery of the first height checking surface in a circular path; the inner diameter gauge part includes a first portion extending in the first direction of the height gauge part and a second portion extending from the first portion in a second direction of the height gauge part that is perpendicular to the first direction, the first portion extending beyond the first height checking surface; a first diameter gauge part having an annular shape; the first diameter gauge part has a variable thickness; the first diameter gauge part includes a first end and a second end that is spaced apart from the first end to define an opening and a second diameter gauge part disposed within the opening and slidably engaging the core of the stator, the second diameter gauge part movable within the opening in the circumferential direction.

In another form, the present disclosure provides a measurement gauge for a stator that includes a first diameter gauge part having an annular shaped base surface, legs, and first and second diameter checking surfaces. The annular shaped base surface faces in a first direction and is configured to abut an end surface of a core of the stator. The legs are spaced apart in a circumferential direction about an axis and extend in the first direction from the base surface. The legs being configured to be received in holes defined by the core of the stator. The first diameter checking surface extends in the circumferential direction. The second diameter checking surface extends in the circumferential direction and is recessed in a second direction relative to the first diameter checking surface. The second direction being perpendicular to the first direction.

In variations of the measurement gauge of the above paragraph, which can be implemented individually or in any combination: the first diameter gauge part has a variable thickness; the first diameter gauge part includes a first end and a second end that is spaced apart from the first end to define an opening; a second diameter gauge part disposed within the opening and slidably engaging the core of the stator, the second diameter gauge part movable within the opening in the circumferential direction; and the first diameter gauge part includes a third diameter checking surface extending in the circumferential direction and being recessed in the second direction a further distance than the second inner circumferential surface.

In yet another form, the present disclosure provides a measurement gauge for a stator that includes a first gauge part and a second gauge part. The first gauge part includes at least one base surface, legs, and first and second height checking surfaces. The base surface faces in a first direction to define a base plane configured to abut an end surface of a core of the stator. The legs are spaced apart in a circumferential direction about an axis and extend in the first direction from the base surface. The legs being configured to be received in holes defined by the core of the stator. The first height checking surface is parallel to the base plane and spaced apart therefrom by a first predetermined distance. The first height checking surface has an annular shape disposed about the axis. The second height checking surface is parallel to the base plane and spaced apart therefrom by a second predetermined distance that is greater than the first predetermined distance. The second gauge part is slidably engaged along a periphery of the first gauge part in a circumferential direction.

In variations of the measurement gauge of the above paragraph, which can be implemented individually or in any combination: the second gauge part extends in the first direction beyond the first height checking surface and the first gauge part includes posts extending radially outwardly from an outer circumferential surface of the first gauge part, and wherein the legs extend in the first direction from respective posts.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
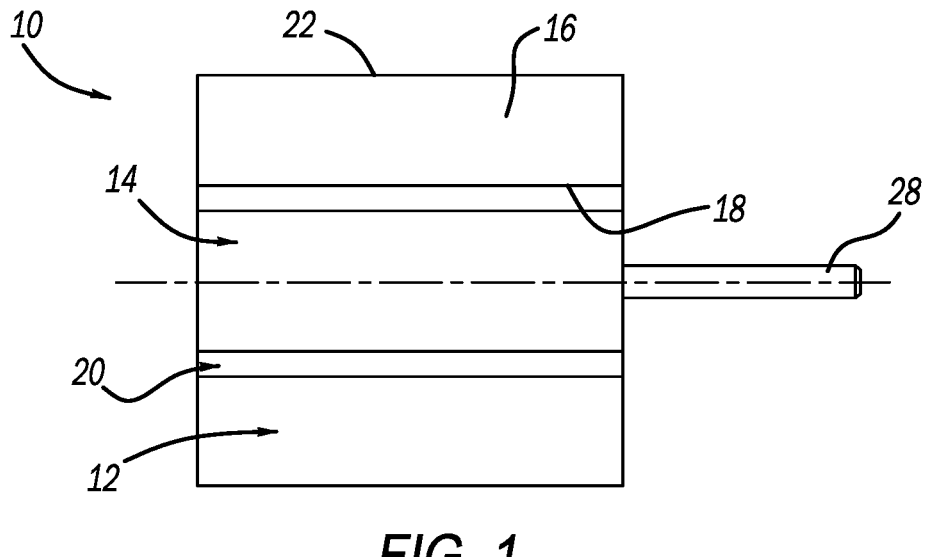
FIG. 1 is a schematic view of an electric machine including a stator and a rotor according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an electric machine 10 may be used in a vehicle (not shown) such as a fully electric vehicle or a hybrid-electric vehicle. The electric machine 10 may be referred to as an electric motor, a traction motor, a generator, or the like. The electric machine 10 may be a permanent magnet machine, an induction machine, or the like. In the example illustrated, the electric machine 10 is a three-phase alternating current (AC) machine, though other types may be used, such as direct current (DC) machines or single phase AC machines for example. In the example provided, the electric machine 10 is a traction motor capable of acting as both a motor to propel the vehicle and as a generator such as during regenerative braking, though the electric machine 10 may be used for other purposes as a motor and/or generator.

The electric machine 10 may be powered by a traction battery (not shown) in the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

Figure 2:
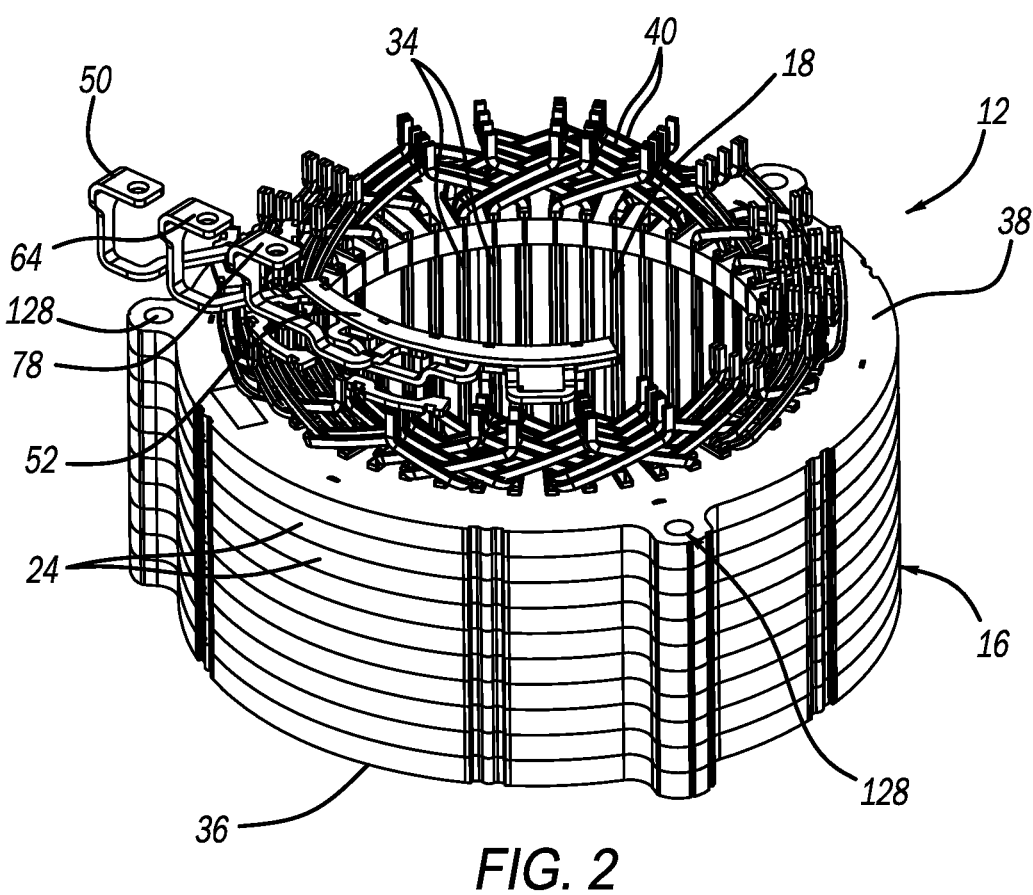
FIG. 2 is a perspective view of the stator of FIG. 1.

With reference to FIGS. 1 and 2, the electric machine 10 includes, inter alia, a stator 12 and a rotor 14 (FIG. 1). The stator 12 includes a cylindrical core 16 having an inner diameter 18 that defines a bore 20 and an outer diameter 22. The core 16 may be formed from a plurality of stacked laminations 24 (FIG. 2). The rotor is supported for rotation within the bore 20 and includes windings or permanent magnets (not shown) that interact with windings of the stator 12 to generate rotation of the rotor 14 when the electric machine 10 is energized. The rotor 14 may be supported on a driveshaft 28 that is configured to couple with a load such as a drivetrain of the vehicle.

The stator core 16 defines stator slots 34 circumferentially arranged around and formed in the inner diameter 18. The slots 34 may be equally spaced around the circumference and extend axially from a first end 36 of the core 16 to a second end 38 of the core 16. The electric machine 10 includes windings 40 placed in the slots 34 of the core 16. In the example provided, the windings 40 are hairpin windings, which increases efficiency by providing a greater amount of stator conductors to reduce resistance of the windings 40 without encroaching into space reserved for the electrical steel and the magnetic flux path. As such, the windings 40 are also referred to herein as the hairpin windings 40. The hairpin windings 40 may be wave windings in which the windings 40 weave pole to pole in a wave-like pattern. The electric machine 10 may be a three-phase AC machine in which the hairpin windings 40 are arranged in a U phase, a V phase, and a W phase. Each phase includes associated conductors (also known as pins, hairpins, or bar conductors) arranged in two parallel paths of windings in the illustrated form. Each phase (i.e., U phase, V phase, and W phase) includes respective paths that start at a respective terminal 50, 64, 78 and ends at a neutral connection 52. The neutral connection 52 may be a single neutral connection, e.g., a single strip of metal, used to connect all six paths, or multiple neutral connections may be used. The terminals 50, 64, 78 may be connected to an inverter and receive voltage from the inverter, which creates torque-producing current in the winding paths causing the rotor 14 to rotate within the stator 12. One example of such three-phase electric machine including terminals 50, 64, 78 and neutral connection 52 is disclosed in U.S. patent application Ser. No. 17/358,489, and titled "HAIRPIN WINDING ELECTRIC MACHINE WITH MULTI-CONDUCTOR HAIRPIN ASSEMBLIES," which is commonly owned with the present application and the contents of which are incorporated herein by reference in its entirety.

The stator 12 undergoes a manufacturing process in which a portion of electrical components (i.e., an end portion of the hairpin windings 40, a portion of the terminals 50, 64, 78, and a portion of the neutral connection 52) are coated with an epoxy material in order to create an electrically insulative layer. In one example, the manufacturing process includes dipping the portion of the electrical components into an epoxy powder while hot. The latent heat in the stator 12 causes the epoxy powder to transition from solid to liquid form where it sticks to the portion of the electrical components and begins to solidify on the portion of the electrical components. The stator 12 including the partially epoxy coated electrical components is then positioned within one or more ovens where the epoxy cures and solidifies fully on the portion of the electrical components. Upon completion of the coating process, dimensions of the epoxy coated electrical components are measured to provide for the epoxy coated electrical components being within predetermined tolerance ranges. Gauges may be used to measure the dimensions of the epoxy coated electrical components.

Figure 5:
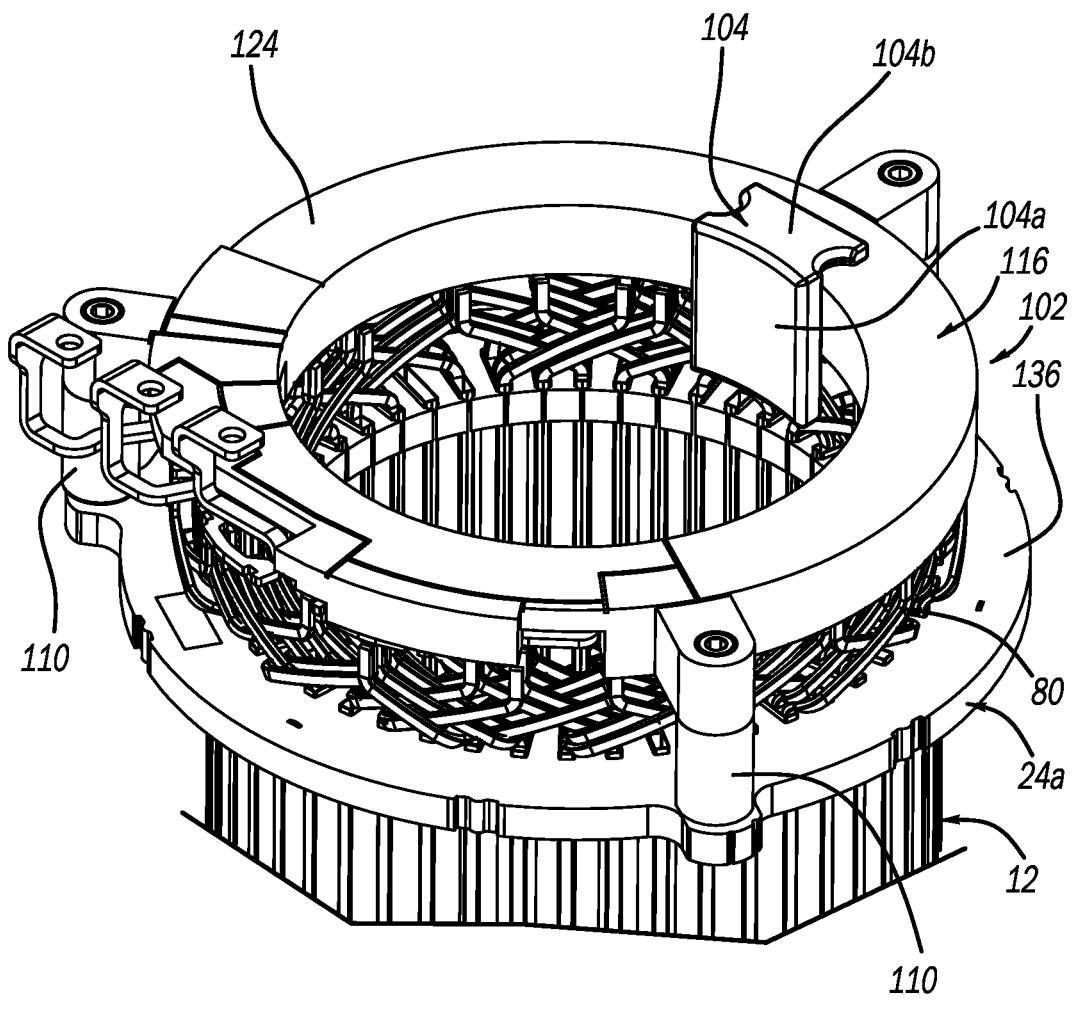
FIG. 5 is a perspective view of the measurement gauge of FIG. 3 secured to the stator of FIG. 1 with a portion of the stator removed for clarity according to the principles of the present disclosure.
Figures 6A, 6B:
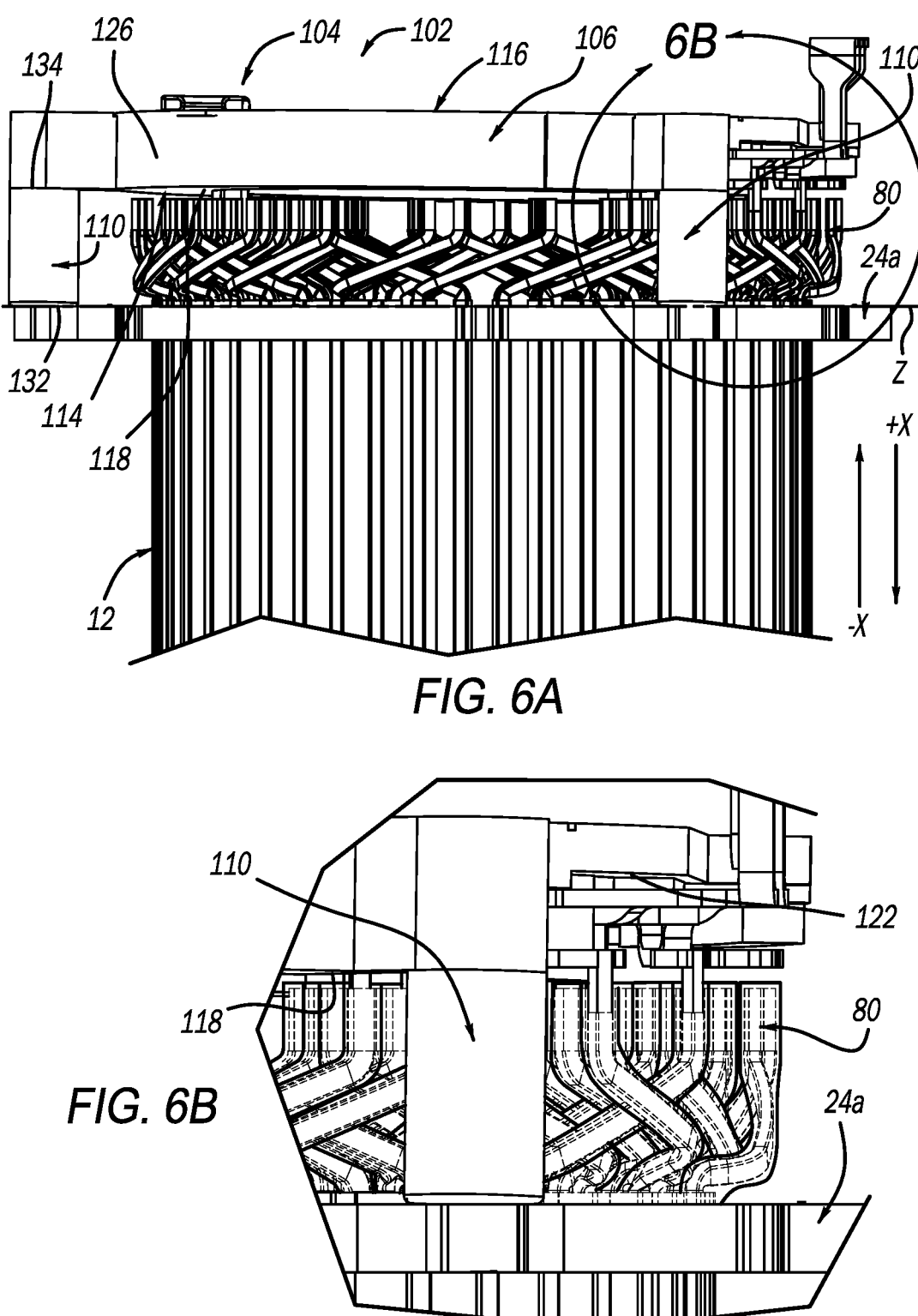
FIG. 6A is a side view of the measurement gauge of FIG. 3 secured to the stator of FIG. 1 with a portion of the stator removed for clarity.
FIG. 6B is an enlarged side view of area 6B shown in FIG. 6A.
Figure 7:
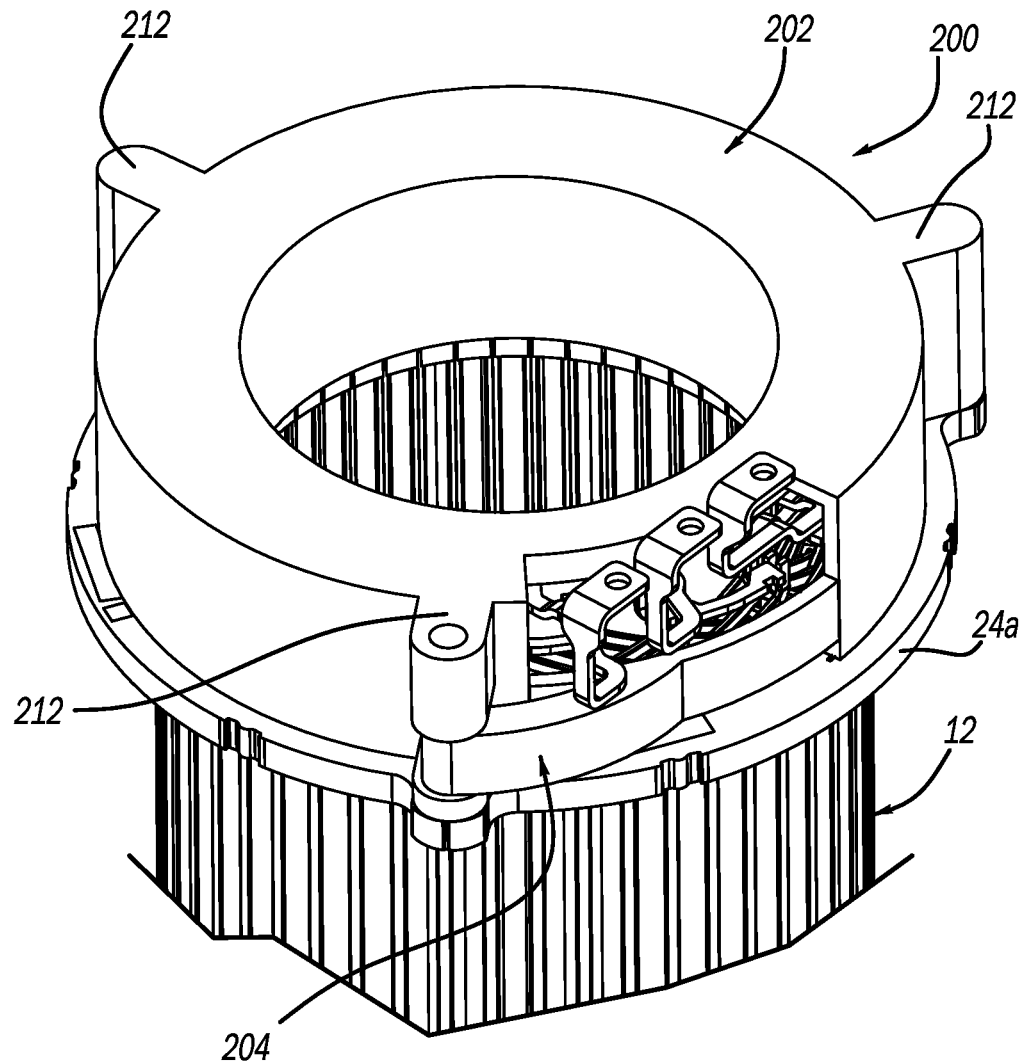
FIG. 7 is a perspective view of yet another measurement gauge including first and second gauge parts secured to the stator of FIG. 1 with a portion of the stator removed for clarity according to the principles of the present disclosure.

With reference to FIGS. 3-5, 6A and 6B, a measurement gauge 100 is provided that includes a height gauge part 102 and a diameter gauge part 104. The height gauge part 102 is configured to be secured to the stator 12 and configured to measure a height of epoxy coated electrical components 80 (FIGS. 6A and 6B). In the example illustrated, the height gauge part 102 is secured to an outer lamination 24a of the stacked laminations 24 of the stator 12 and includes a body 106, posts 108, and a plurality of legs 110. When the height gauge part 102 is secured to the stator 12, the body 106 and the posts 108 are located substantially above the epoxy coated electrical components 80 (FIGS. 6A and 6B).

Figures 3, 4:
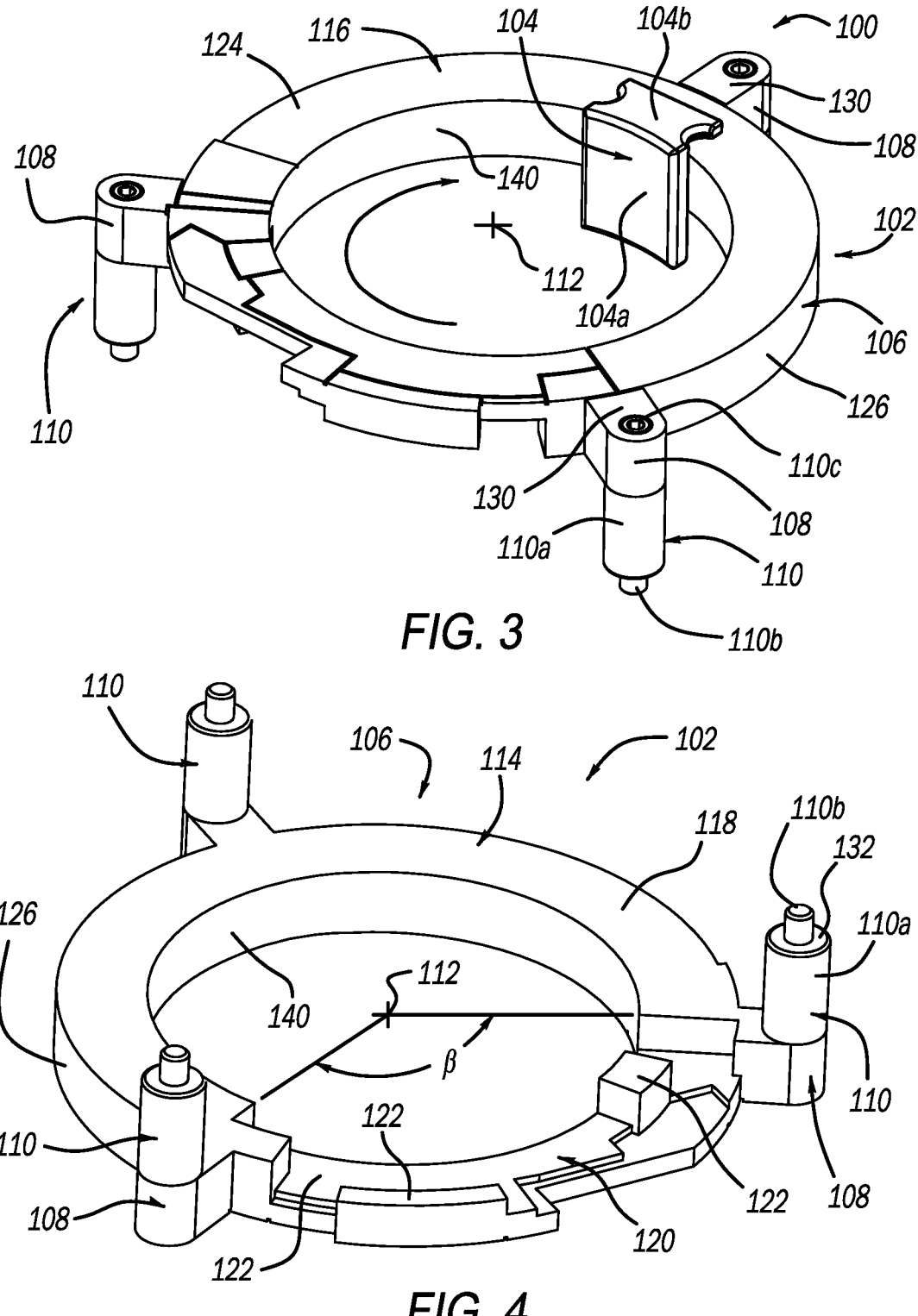
FIG. 3 is a perspective view of a measurement gauge including a height gauge part and a diameter gauge part according to the principles of the present disclosure.
FIG. 4 is a perspective view of the height gauge part of the measurement gauge of FIG. 3.

The body 106 is disposed about a central axis 112 and has a ring shape. The body 106 includes an inner side 114 (FIGS. 4 and 6A) facing in a first direction +X toward the epoxy coated electrical components 80 and an outer side 116 (FIGS. 3, 5, and 6A) facing in a second direction −X away from the epoxy coated electrical components 80. The inner side 114 includes a height checking surface 118 (FIGS. 4 and 6A) and a recessed region 120 (FIG. 4). The recessed region 120 spans an angle β less than or equal to 122 degrees along a circumference of the inner side 114 about the central axis 112. It should be understood that the recessed region 120 may span a different angle based on the size of the stator 12. The recessed region 120 also includes a plurality of height checking surfaces 122 that are recessed in the second direction −X relative to the height checking surface 118. The outer side 116 includes an outer surface 124 that extends around substantially an entire circumference of the body 106 (i.e., extends 360 degrees around the body 106). The height checking surfaces 122 are located between the outer surface 124 and the height checking surface 118.

The posts 108 are spaced apart from each other around the body 106 and extend radially outwardly from an outer circumference surface 126 of the body 106. The posts 108 include openings that are vertically aligned (and concentric) with respective lug holes 128 (FIG. 2) of the stator core 16. Each post 108 has a surface 130 that is coplanar with the surface 124 of the body 106. The plurality of legs 110 are secured to respective posts 108 and are configured to be received in lug holes 128 of the stator core 16. In this way, the height gauge part 102 is secured to the stator 12. In the example illustrated, the legs 110 are removably secured to the respective posts 108. In another form, the legs 110 are fixed to the respective posts 108. The legs 110 extend in the first direction +X from the respective posts 108 and are spaced apart from each other in a circumferential direction about the axis 112.

Figure 14:
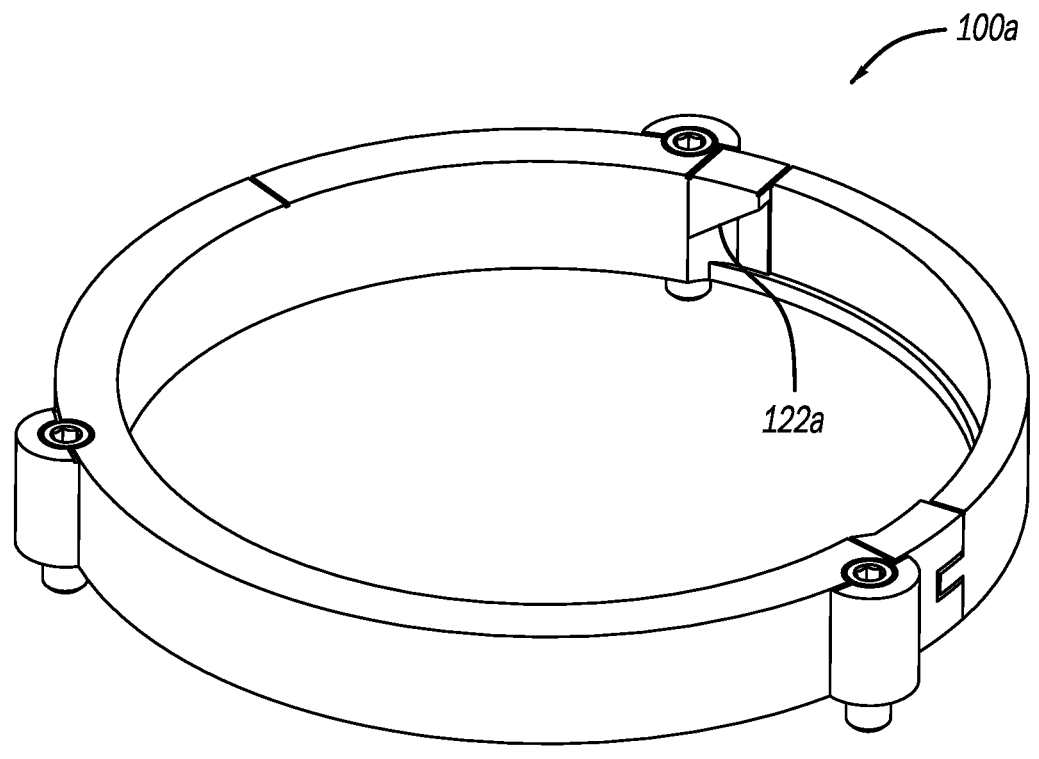
FIG. 14 is a perspective view of another measurement gauge according to the principles of the present disclosure.

In the example illustrated, each leg 110 is configured to be secured the body 106 of the height gauge part 102 to the stator 12 and includes a body portion 110a and an end portion 110b. The body portion 110a has a generally cylindrical shape and includes a first axial end surface 132 (FIG. 6A) that faces in the first direction +X and a second axial end surface 134 (FIG. 6A) that faces in the second direction −X. The first axial end surfaces 132 of the legs 110 define a base plane Z (FIG. 6A) and are configured to abut an end surface 136 of an outermost lamination 24a of the stator core 16. The base plane Z is parallel to the height checking surface 118. In the example provided in FIGS. 3-5, 6A, and 6B, the height checking surfaces 122 are also planar and parallel to the base plane Z. In other configurations, such as FIG. 14, one or more of the height checking surfaces 122a of measurement gauge 100a may be non-planar or not parallel to the base plane Z for example. The second axial end surface 134 of each leg 110 abuts a respective post 108. The end portion 110b of each leg 110 extends in the first direction +X from the first axial end surface 132 and is configured to be received in a respective lug hole 128. A fastener 110c such as a bolt or screw, for example, may extend at least partially through a respective post 108 and at least partially through a respective leg 110, thereby securing the respective leg 110 to the body 106. In some forms, each leg 110 may include another end portion (not shown) extending in the second direction −X from the second axial end surface 134 and into a respective post 108. When the height gauge part 102 is secured to the stator 12 as described above, the height checking surfaces 118, 122 are spaced apart from the base plane Z by predetermined distances. In the example illustrated, the distance between the base plane Z and any one of the height checking surfaces 122 is greater than the distance between the base plane Z and the height checking surface 118. In the example illustrated, the distance between the base plane Z and the height checking surface 118 is determined by a length of the body portion 110a.

With reference to FIGS. 3 and 5, the diameter gauge part 104 is slidably engaged along an inner circumferential surface 140 of the height gauge part 102 in a circular path and is configured to measure an inner diameter of the epoxy coated electrical components 80. The diameter gauge part 104 includes a first body portion 104a extending in an axial direction of the height gauge part 102 and a second body portion 104b extending perpendicularly from the first body portion 104a in a radial direction of the height gauge part 102. The first body portion 104a has a shape that corresponds to the shape of the inner circumferential surface 140 of the height gauge part 102 and is slidably engaged with the inner circumferential surface 140 of the height gauge part 102. The second body portion 104b is slidably engaged with the outer surface 124 of the body 106 as the diameter gauge part 104 is moving in the circular path around the height gauge part 102. The height of the first body portion 104a is such that when the second body portion 104b is slidably engaged with the outer surface 124 of the body 106, the first body portion 104a extends axially beyond (in the X+ direction) the height checking surface 114. In the example provided, the height of the first body portion 104a is such that when the second body portion 104b is slidably engaged with the outer surface 124 of the body 106, the first body portion 104a extends axially to a location axially between the height checking surface 114 and the first axial end surface 132.

With continued reference to FIGS. 3-5, 6A and 6B, operation of the measurement gauge 100 will be described in detail. First, the height gauge part 102 is secured to the stator 12 as described above. Once the height gauge part 102 is secured onto the stator 12, the height gauge part 102 is visually inspected to determine whether or not the epoxy coating is within a predetermined height tolerance range. That is, if the first axial end surface 132 of each leg 110 engages the outermost lamination 24a of the stator 12, then the epoxy coated electrical components 80 are within a predetermined height tolerance range. If the first axial end surface 132 of each leg 110 does not engage the outermost lamination 24a of the stator 12, then the epoxy coated electrical components 80 may extend in the second direction –X beyond the predetermined height tolerance range. The predetermined height tolerance range may be between 33 millimeters (mm) and 48 millimeters (mm).

If the first axial end surface 132 of each leg 110 engages the outermost lamination 24a of the stator 12, then the inner diameter of the epoxy coated electrical components 80 is inspected to determine whether or not the epoxy coating is within a predetermined inner diameter tolerance range. That is, the diameter gauge part 104 moves along the inner circumferential surface 140 as described above. If the diameter gauge part 104 moves along the inner circumferential surface 140 without being impeded by the epoxy coated electrical components 80, then the epoxy coated electrical components 80 are within a predetermined inner diameter tolerance range. If the diameter gauge part 104 is impeded by the epoxy coated electrical components 80, then the epoxy coated electrical components 80 may not be within the predetermined inner diameter tolerance range (i.e., the epoxy coated electrical components 80 may extend radially inwardly toward the axis 112 beyond the predetermined inner diameter tolerance range).

With reference to FIGS. 7-10, another measurement gauge 200 is provided. The structure and function of the measurement gauge 200 may be similar or identical to that of gauge 100 described above, apart from any exception noted below. The measurement gauge 200 includes a first gauge part 202 and a second gauge part or flap 204. The first gauge part 202 is configured to be secured to the stator 12 and configured to measure a height and inner and outer diameters of the epoxy coated electrical components 80. In the example illustrated, the first gauge part 202 is configured to be secured to the outer lamination 24a of the stacked laminations 24 of the stator 12 and includes a body 206, an inner flange 208 (FIGS. 9 and 10), an outer flange 210, posts

Figures 8, 9:
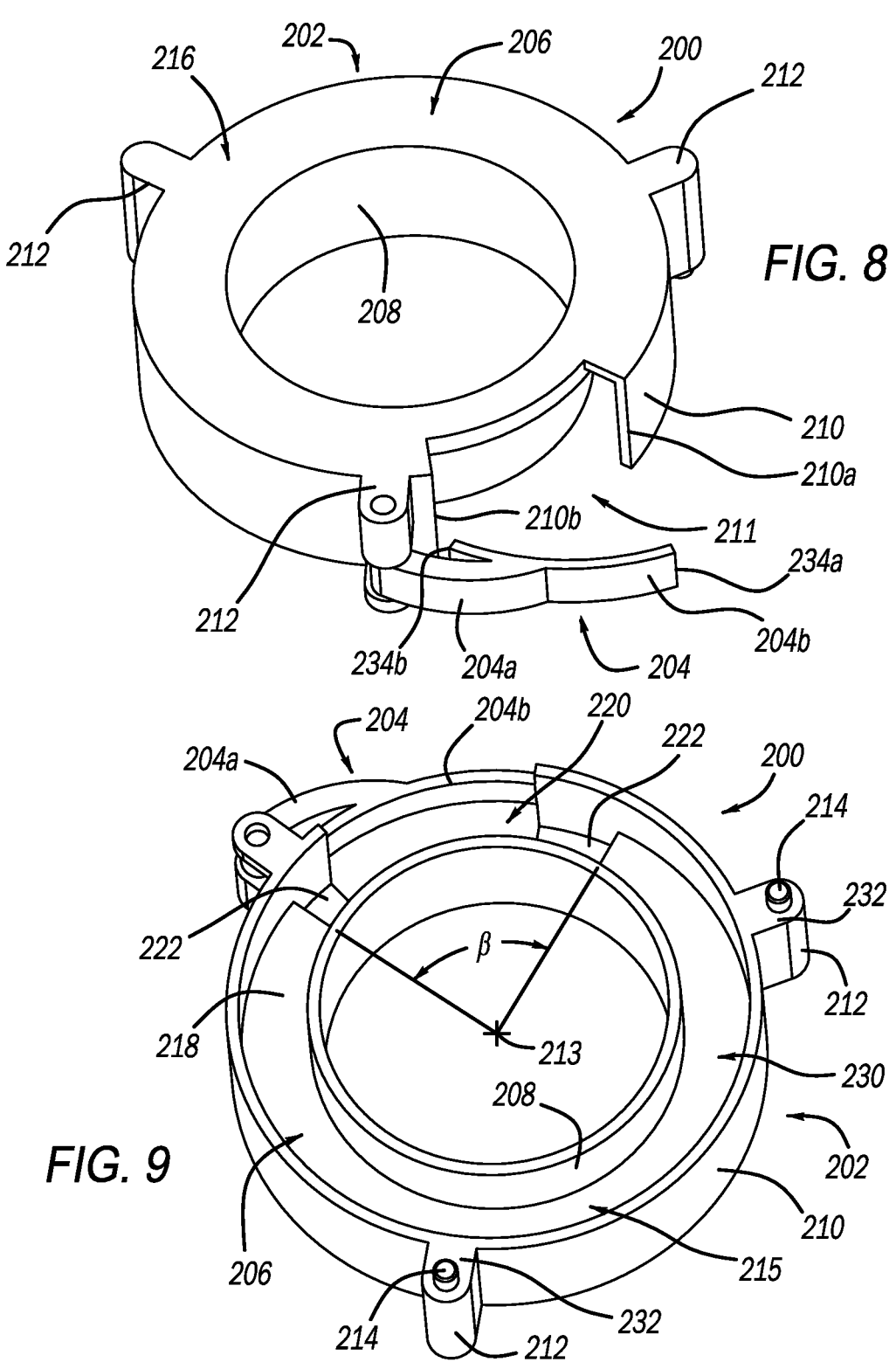
FIG. 8 is a perspective view of the measurement gauge of FIG. 7 with the first gauge part in the open position.
FIG. 9 is another perspective view of the measurement gauge of FIG. 7 with the first gauge part in the closed position.

212, and a plurality of legs 214 (FIG. 9). When the measurement gauge 200 is secured to the stator 12, the body 206 is located above the epoxy coated electrical components 80.

The body 206 is disposed about a central axis 213 and has a ring shape. The body 206 includes an inner side 215 facing in a first direction +X toward the epoxy coated electrical components 80 and an outer side 216 facing in a second direction –X away from the epoxy coated electrical components 80. The inner side 215 includes a height checking surface 218 and a recessed region 220. As shown in FIG. 9, the recessed region 220 spans an angle β less than or equal to 122 degrees along a circumference of the inner side 215 about the central axis 213. The recessed region 220 also includes a plurality of height checking surfaces 222 that are recessed in the second direction –X relative to the height checking surface 218.

Figure 10:
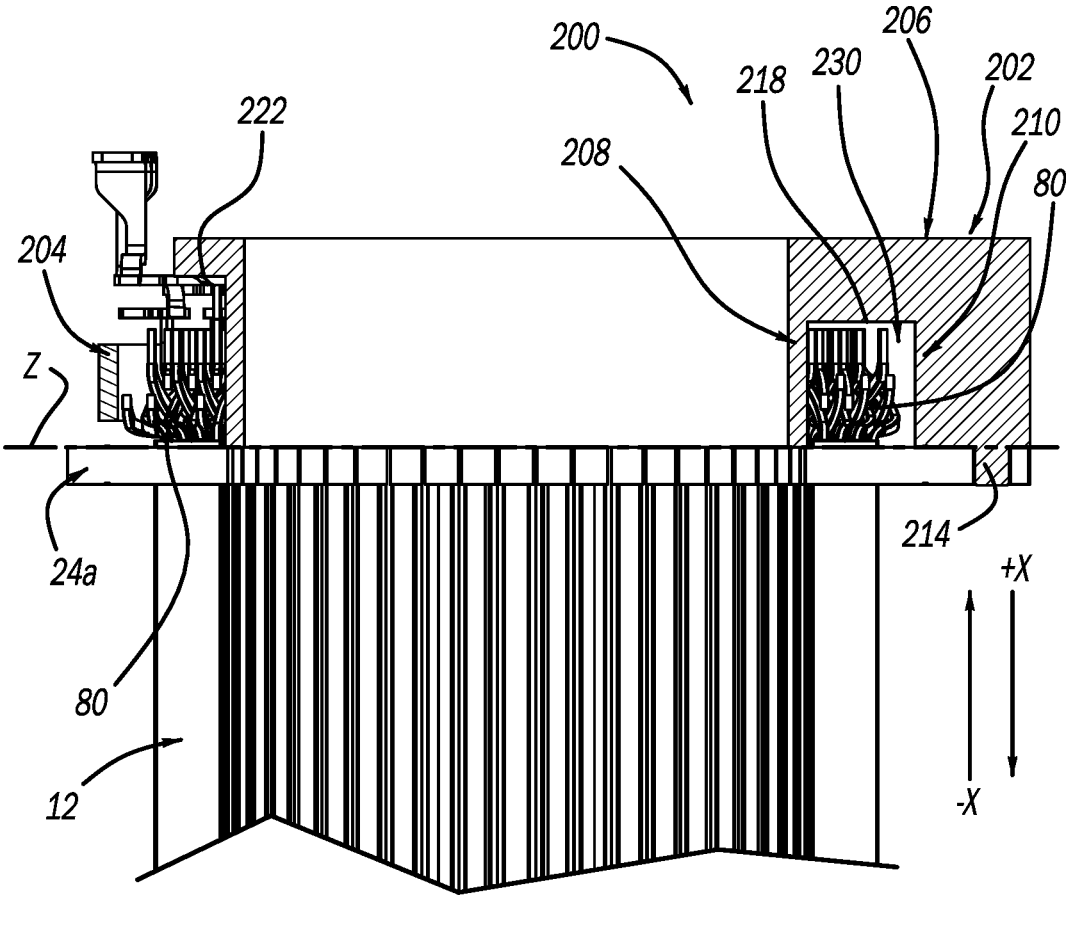
FIG. 10 is a cross-sectional view of the measurement gauge of FIG. 7 secured to the stator of FIG. 1 with a portion of the stator removed for clarity according to the principles of the present disclosure.

With reference to FIGS. 9 and 10, the inner flange 208 extends around an inner periphery of the body 206 and extends from the inner periphery of the body 206 in the first direction +X. The outer flange 210 extends around an outer periphery of the body 206 and extends from the outer periphery of the body 206 in the first direction +X. The outer flange 210 includes a first end 210a and a second end 210b that are spaced apart from each other, thereby forming an opening 211. The outer flange 210 is configured to abut the outer lamination 24a of the stacked laminations 24 of the stator 12 when the measurement gauge 200 is secured to the stator 12. In some forms, the inner flange 208 may contact the outer lamination 24a of the stator 12 when the measurement gauge 200 is secured to the stator 12. In other forms, the inner flange 208 may not contact the outer lamination 24a of the stator 12 (be spaced apart from the outer lamination 24a) when the measurement gauge 200 is secured to the stator 12. The body 206 and the inner and outer flanges 208, 210 cooperate to form an annular compartment 230 (FIGS. 9 and 10) configured to receive the epoxy coated electrical components 80 when the measurement gauge 200 is secured to the stator 12. In this way, the inner flange 208 is located radially inwardly relative to the epoxy coated electrical components 80 and can measure whether or not the epoxy coated electrical components 80 are within an inner diameter tolerance range. Similarly, the outer flange 210 is located radially outwardly relative to the epoxy coated electrical components 80 and can measure whether or not the epoxy coated electrical components 80 that the outer flange 210 surrounds are within an outer diameter tolerance range. If the end surfaces 232 of the posts 212 engage the outermost lamination 24a of the stator 12, then a portion of the epoxy coated electrical components 80 that is surrounded by the first gauge part 202 is within a predetermined height tolerance range, outer diameter tolerance range, and inner diameter tolerance range.

The posts 212 are spaced apart from each other around the outer flange 210 and extend radially outwardly from the outer flange 210. The posts 212 are vertically aligned (and concentric) with respective lug holes 128 of the stator core 16. The plurality of legs 214 are secured to respective posts 212 and are configured to be received in lug holes 128 of the stator core 16. In this way, the first gauge part 202 is secured to the stator 12. The legs 214 extend in the first direction +X from the respective posts 212 and are spaced apart in a circumferential direction about the axis 213.

End surfaces 232 of the posts 212 define a base plane Z and are configured to abut the end surface 136 of the outermost lamination 24a of the stator core 16. The base plane Z is parallel to the height checking surface 218. In the example provided, the height checking surfaces 222 are also planar and parallel to the base plane Z, though other configurations can be used, such as one or more of the height checking surfaces 222 being non-planar or not parallel to the base plane Z for example. When the first gauge part 202 is secured to the stator 12 as described above, the height checking surfaces 218, 222 are spaced apart from the base plane Z by predetermined distances. In the example illustrated, the distance between the base plane Z and any one of the height checking surfaces 222 is greater than the distance between the base plane Z and the height checking surface 218.

The flap 204 is pivotably coupled to one post 212 between an open position (FIG. 8) in which the flap 204 is removed from the opening 211 of the first gauge part 202 and a closed position (FIGS. 7, 9, and 10) in which the flap 204 closes the opening 211 of the first gauge part 202, thereby forming a continuous, closed profile of the outer flange 210. If the flap 204 closes to form a continuous, closed profile of the outer flange 210 when the first gauge part 202 is secured to the stator 12, then the epoxy coated electrical components 80 that the flap 204 surrounds are within the outer diameter tolerance range.

The flap 204 includes an attachment portion 204a and a flange portion 204b. The attachment portion 204a may be arcuate and is pivotably secured to the post 212. The attachment portion 204a may have a thickness that is greater than a thickness of the flange portion 204b. The flange portion 204b is arcuate and extends from the attachment portion 204a. When the flap 204 is in the closed position, a first end 234a of the flange portion 204b is adjacent or abuts the end 210a of the outer flange 210 and a second end 234b of the flange portion 204b is adjacent or abuts the end 210b of the outer flange 210, thereby forming the continuous, closed profile of the outer flange 210.

Figure 11:
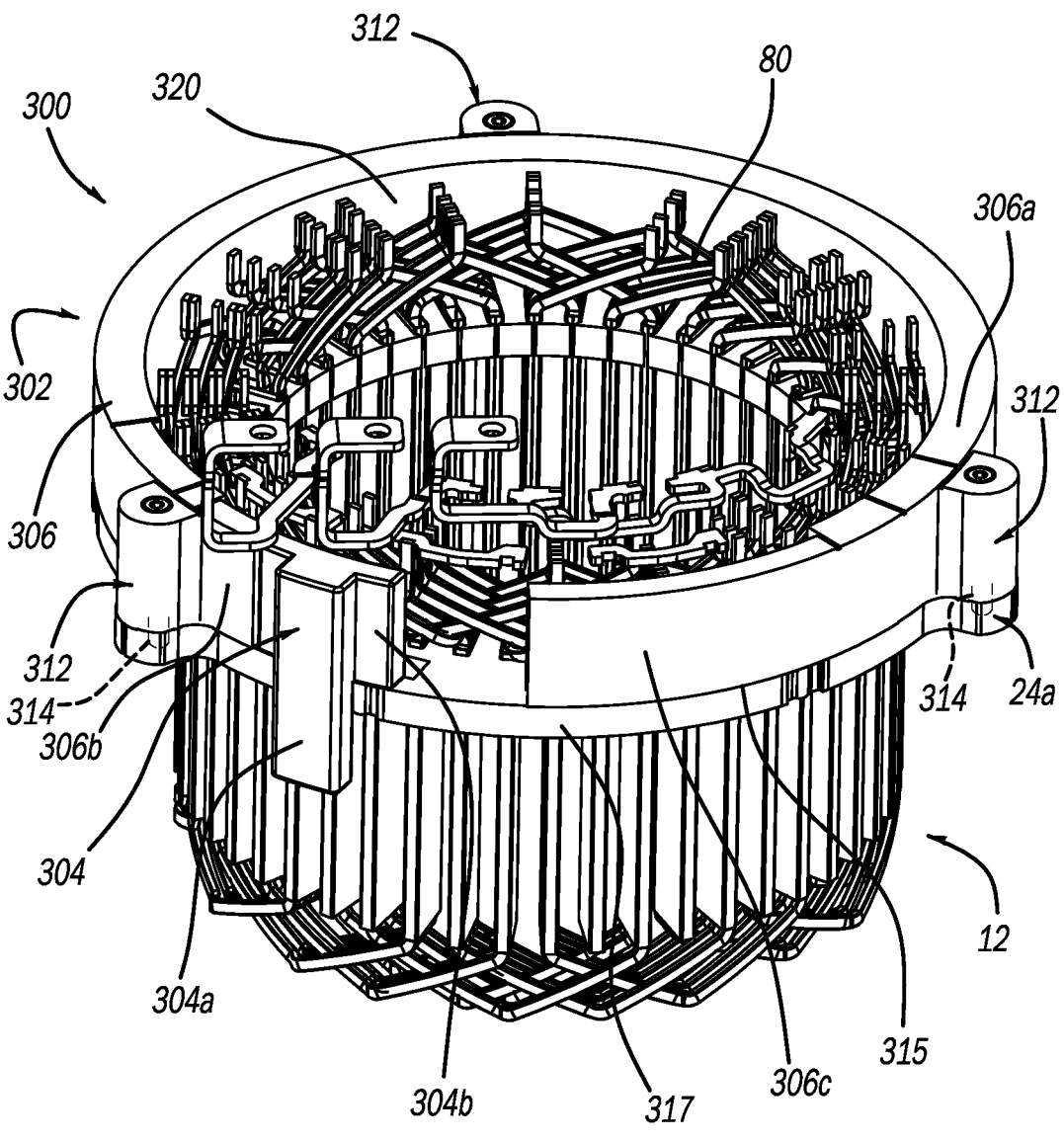
FIG. 11 is a perspective view of another measurement gauge including first and second diameter gauge parts secured to the stator of FIG. 1 with a portion of the stator removed for clarity according to the principles of the present disclosure.
Figure 12:
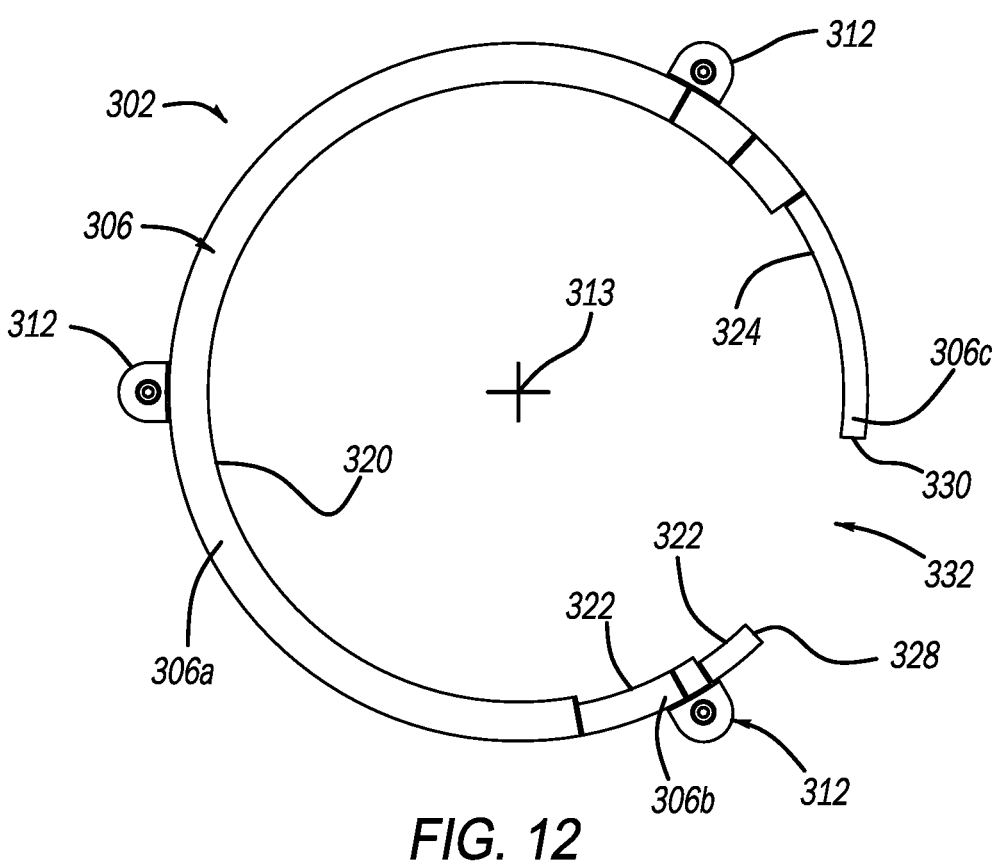
FIG. 12 is a top view of the first diameter gauge of FIG. 11.

With reference to FIGS. 11 and 12, another measurement gauge 300 is provided. The structure and function of the measurement gauge 300 may be similar or identical to that of gauges 100, 200 described above, apart from any exception noted below. The measurement gauge 300 includes a first gauge part 302 and a second gauge part 304. The first gauge part 302 is configured to be secured to the stator 12 and configured to measure an outer diameter of the epoxy coated electrical components 80. In the example illustrated, the first gauge part 302 is configured to be secured to the outer lamination 24a of the stacked laminations 24 of the stator 12 and includes an annular body 306, posts 312, and a plurality of legs 314 (FIG. 11). When the measurement gauge 300 is secured to the stator 12, the measurement gauge 300 is located radially outwardly relative to the epoxy coated electrical components 80.

The body 306 includes an intermediate portion 306a and end portions 306b, 306c. The intermediate portion 306a is disposed between the end portions 306b, 306c and includes an inner circumferential surface 320. The end portion 306b includes one or more inner circumferential surfaces 322 that are recessed radially outwardly relative to the inner circumferential surface 320. As shown in FIG. 12, each inner circumferential surface 322 of the end portion 306b is recessed radially outward a different distance from the inner circumferential surface 320 of the intermediate portion 306a. The end portion 306c includes one or more inner circumferential surfaces 324 that are recessed radially outwardly relative to the inner circumferential surface 320. Each inner circumferential surface 324 of the end portion 306c may be recessed radially outward a different distance from the inner circumferential surface 320 of the intermediate portion 306a. In this way, the end portions 306b, 306c have a thickness that is different from the thickness of the body 306, thereby providing the first gauge part 302 having a variable thickness. The end portion 306b has an end surface 328 that is spaced apart from an end surface 330 of the end portion 306c, thereby forming an opening 332 therebetween. When the first gauge part 302 is secured to the stator 12, a lower surface 315 of the body 306 abuts the outermost lamination 24a of the stator 12.

The posts 312 are spaced apart from each other around the body 306 (i.e., around the intermediate portion 306a and/or the end portions 306b, 306c) and extend radially outwardly from the body 306. The posts 312 are vertically aligned (and concentric) with respective lug holes 128 of the stator core 16. The plurality of legs 314 are secured to respective posts 312 and are configured to be received in lug holes 128 of the stator core 16. In this way, the first gauge part 302 is secured to the stator 12. The legs 314 extend in an axial direction from the respective posts 312 and are spaced apart in a circumferential direction about axis 313.

The second gauge part 304 is configured to be received in the opening 332 between the end portions 306b, 306c and slidably engaged with the outer lamination 24a of the stator 12. In this way, the second gauge part 304 is configured to measure an outer diameter of a portion of the epoxy coated electrical components 80. The second gauge part 304 includes a first body portion 304a and a second body portion 304b. When the second gauge part 304 is received in the opening 332, the second gauge part 304 is moveable within the opening 332 in a circumferential direction. The first body portion 304a extends beyond the lower surface 315 of the first gauge part 302 and is configured to be slidably engaged with an outer circumferential surface 317 of the laminations 24. The second body portion 304b is configured to be slidably engaged with the end surface 136 of the outermost lamination 24a and is moveable in a circumferential direction. The second body portion 304b may abut the end portion 306b to inhibit further movement in a first circumferential direction and may abut the end portion 306c to inhibit further movement in a second circumferential direction that is opposite the first circumferential direction.

With continued reference to FIGS. 11 and 12, operation of the measurement gauge 300 will be described in detail. First, the first gauge part 302 is secured to the stator 12 as described above (i.e., the legs 314 are received in the lug holes 128 of the stator core 16). If the first gauge part 302 is secured to the stator 12 such that it is leveled on the stator 12, then the epoxy coated electrical components 80 surrounded by the first gauge part 302 are within a predetermined outer diameter tolerance range. If the first gauge part 302 cannot be secured to the stator 12 (i.e., the legs 314 are not received in the holes 128), then the epoxy coated electrical components 80 may extend radially outward beyond the predetermined outer diameter tolerance range.

If the first gauge part 302 is secured to the stator 12, then the outer diameter of a portion of the epoxy coated electrical components 80 not surrounded by the first gauge part 302 is measured to determine whether or not the epoxy coating is within the predetermined outer diameter tolerance range. That is, the second gauge part 304 moves in the circumferential direction in the opening 332 as described above. If the second gauge part 304 moves along the opening 332 without being impeded by the portion of the epoxy coated electrical components 80, then the portion of the epoxy coated electrical components 80 are within the predetermined outer diameter tolerance range. If the diameter gauge part 104 is impeded by the epoxy coated electrical components 80, then the epoxy coated electrical components 80 may not be within the predetermined outer diameter tolerance range.

Figure 13:
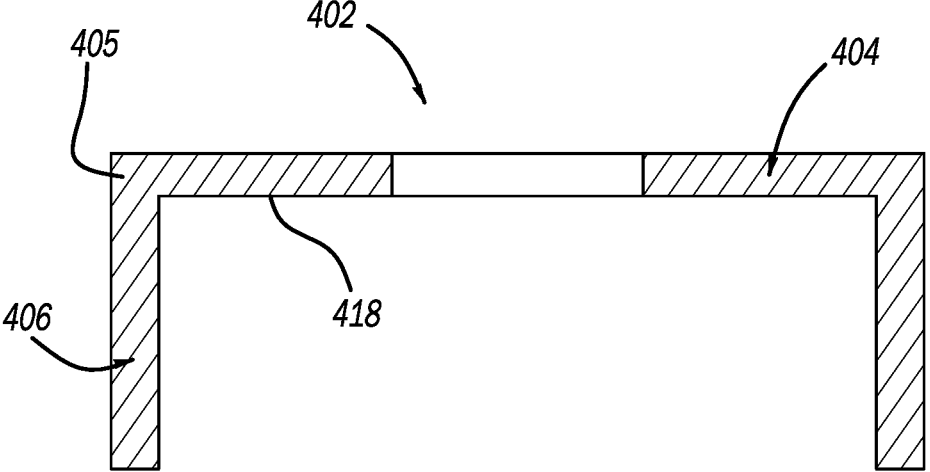
FIG. 13 is a cross-sectional view of yet another measurement gauge according to the principles of the present disclosure.

In some forms, as shown in FIG. 13, a first gauge part 402 is provided. The structure and function of the first gauge part 402 may be similar or identical to the first gauge part 302 described above, apart from any exception noted below. The first gauge part 402 includes a lip 404 extending radially inwardly from an upper surface 405 of body 406. The lip 404 may include a structure and function similar to the body 106 described above (i.e., the lip 404 may include a plurality of height measuring surfaces (not shown) that are recessed relative height measuring surface 418). In this way, when the first gauge part 402 is secured to the stator 12, the lip 404 extends over the epoxy coated electrical components 80 and can measure the height of the epoxy coated electrical components 80 as described above.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A measurement gauge for a stator, the measurement gauge comprising:
   a height gauge part including:
      at least one base surface facing in a first direction to define a base plane configured to abut an end surface of a core of the stator;
      a plurality of legs spaced apart in a circumferential direction about an axis and extending in the first direction from the at least one base surface, the legs being configured to be received in holes defined by the core of the stator; and
      a first height checking surface parallel to the base plane and spaced apart therefrom by a predetermined distance, the first height checking surface having an annular shape disposed about the axis.

2. The measurement gauge of claim 1, wherein the height gauge part includes at least one second height checking surface that is recessed in a second direction that is opposite the first direction, the at least one second height checking surface extending in a circumferential direction.

3. The measurement gauge of claim 2, wherein the at least one second height checking surface is parallel to the base plane.

4. The measurement gauge of claim 2, wherein the at least one second height checking surface is non-parallel to the base plane.

5. The measurement gauge of claim 1, wherein the height gauge part includes an inner flange extending around an inner periphery of the first height checking surface and extending from the inner periphery of the first height checking surface in the first direction.

6. The measurement gauge of claim 5, wherein the height gauge part includes an outer flange extending around an outer periphery of the first height checking surface and extending from the outer periphery of the first height checking surface in the first direction.

7. The measurement gauge of claim 5, wherein:
   the height gauge part including an outer flange extending from an outer periphery of the first height checking surface in the first direction and extending in the circumferential direction, the outer flange including a first end and a second end that is spaced apart from the first end to define an opening; and
   a flap pivotably coupled to the height gauge part between an open position in which the flap is removed from the opening and a closed position in which the flap closes the opening.

8. The measurement gauge of claim 1, further comprising an inner diameter gauge part slidably engaged along an inner periphery of the first height checking surface in a circular path.

9. The measurement gauge of claim 8, wherein the inner diameter gauge part includes a first portion extending in the first direction of the height gauge part and a second portion extending from the first portion in a second direction of the height gauge part that is perpendicular to the first direction, the first portion extending beyond the first height checking surface.

10. The measurement gauge of claim 1, further comprising a first diameter gauge part having an annular shape.

11. The measurement gauge of claim 10, wherein the first diameter gauge part has a variable thickness.

12. The measurement gauge of claim 10, wherein:

the first diameter gauge part includes a first end and a second end that is spaced apart from the first end to define an opening; and a second diameter gauge part disposed within the opening and slidably engaging the core of the stator, the second diameter gauge part movable within the opening in the circumferential direction.

13. A measurement gauge for a stator, the measurement gauge comprising:

a first diameter gauge part including:

an annular shaped base surface facing in a first direction and configured to abut an end surface of a core of the stator;

a plurality of legs spaced apart in a circumferential direction about an axis and extending in the first direction from the base surface, the legs being configured to be received in holes defined by the core of the stator;

a first diameter checking surface extending in the circumferential direction; and a second diameter checking surface extending in the circumferential direction and being recessed in a second direction relative to the first diameter checking surface, the second direction being perpendicular to the first direction.

14. The measurement gauge of claim 13, wherein the first diameter gauge part has a variable thickness.

15. The measurement gauge of claim 13, wherein the first diameter gauge part includes a first end and a second end that is spaced apart from the first end to define an opening.

16. The measurement gauge of claim 15, further comprising a second diameter gauge part disposed within the opening and slidably engaging the core of the stator, the second diameter gauge part movable within the opening in the circumferential direction.

17. The measurement gauge of claim 13, wherein the first diameter gauge part includes a third diameter checking surface extending in the circumferential direction and being recessed in the second direction a further distance than the second diameter checking surface.

18. A measurement gauge for a stator, the measurement gauge comprising:

a first gauge part including:

at least one base surface facing in a first direction to define a base plane configured to abut an end surface of a core of the stator;

a plurality of legs spaced apart in a circumferential direction about an axis and extending in the first direction from the at least one base surface, the legs being configured to be received in holes defined by the core of the stator; and a first height checking surface parallel to the base plane and spaced apart therefrom by a first predetermined distance, the first height checking surface having an annular shape disposed about the axis;

at least one second height checking surface parallel to the base plane and spaced apart therefrom by a second predetermined distance that is greater than the first predetermined distance; and a second gauge part slidably engaged along a periphery of the first gauge part in a circumferential direction.

19. The measurement gauge of claim 18, wherein the second gauge part extends in the first direction beyond the first height checking surface.

20. The measurement gauge of claim 18, wherein the first gauge part includes posts extending radially outwardly from an outer circumferential surface of the first gauge part, and wherein the legs extend in the first direction from respective posts.

* * * * *